May 6, 1969     A. L. BAKER     3,442,578

OPTICAL DEVIATORS

Filed May 6, 1966     Sheet 1 of 2

INVENTOR,
Allister L. Baker

BY: Harry M. Saragovitz,
Edward J. Kelly &
A. J. Dupont     ATTORNEYS.

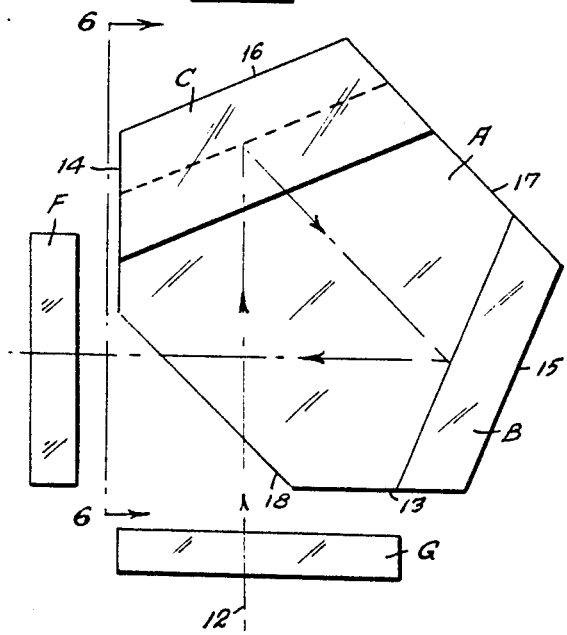
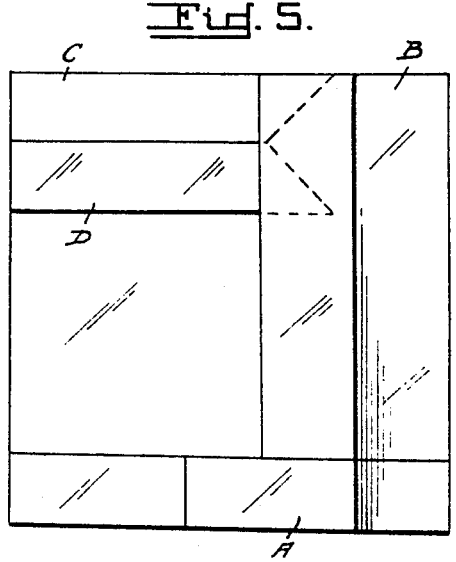
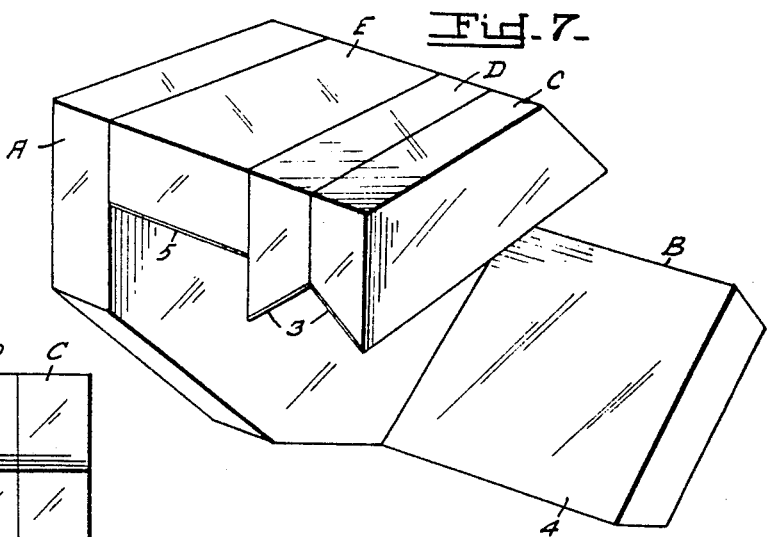
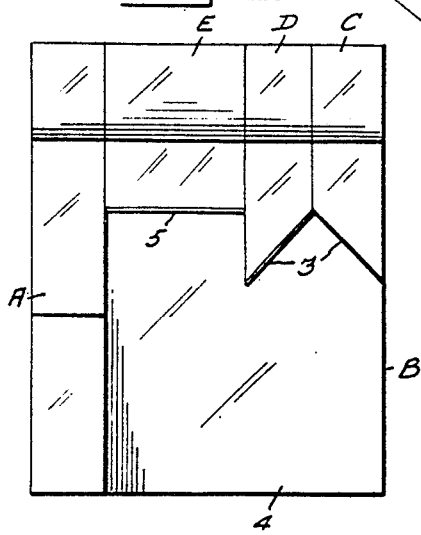

United States Patent Office 3,442,578
Patented May 6, 1969

3,442,578
OPTICAL DEVIATORS
Allister L. Baker, Denville, N.J., assignor, by mesne assignments, to the United States of America as represented by the Secretary of the Army
Filed May 6, 1966, Ser. No. 548,327
Int. Cl. G02b 5/04
U.S. Cl. 350—286   4 Claims

ABSTRACT OF THE DISCLOSURE

The present optical deviator is made of fused quartz to obtain a very low distortion of the basic components. The reflective surfaces are coated externally such that the light rays do not enter the basic components. Therefore, the light rays are not distorted inside of the material, and the quartz components themselves are not distorted due to temperature changes.

---

The invention disclosed herein relates to optical deviators.

The need for more accurate and more precise means of optical image dispersion has recently been felt in fields such as astronomy, biology, photography and telementry. The art of optical deviators must provide such means, in accordance with the metamorphoses of the sciences which require their ultilization.

Among the optical light dispersion means disclosed by the prior art, are multifaceted crystals and spatially related mirrors. The present invention offers the most favorable aspects of both systems. For optical deviators of the highest precision it is desirable to use the most stable material available. Fused quartz with its extremely low coefficient of expansion possesses the necessary stability, but no quartz supplier has been able to furnish quartz of uniformity of optical properties sufficient to permit light to pass through the crystal without image distortion. To obviate this difficulty, the present deviator was conceived. Its optical path is completely in the air with the quartz on the outside of the reflecting surfaces. Thus, the stability of the quartz may be utilized, without impairing optical dispersion. Further, the present invention provides novel structural shapes having rigidity consistent with the added stability of the system.

It is the primary object of the present invention to provide an optical deviator of highest precision.

It is another object of the present invention to provide an optical deviator of great temperature stability.

It is a final object of the present invention to provide an optical deviator of extreme structural rigidity.

These and other objects and advantages of the present invention will be full apparent from the following description taken in connection with the annexed drawing, in which:

FIG. 4 is a side view of a second embodiment of the instant invention—a 90° deviator;

FIG. 5 is a bottom view of FIG. 4;

FIG. 6 is an end view looking along line 6—6 of FIG. 4 in the direction of the arrows; and FIG. 7 is a perspective view of the deviator of FIGS. 4 to 6.

In both embodiments all structural elements are fused quartz, all reflecting surfaces are aluminized faces, and all elements are mounted on a base plate composed of quartz.

Figure 1:
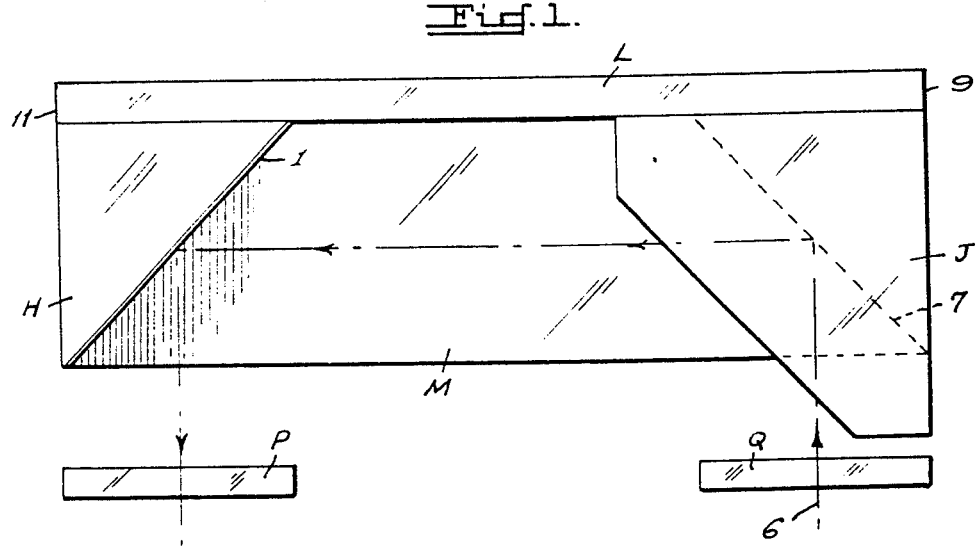
FIG. 1 is a side view of one embodiment of the present invention—a 180° deviator.
Figure 2:
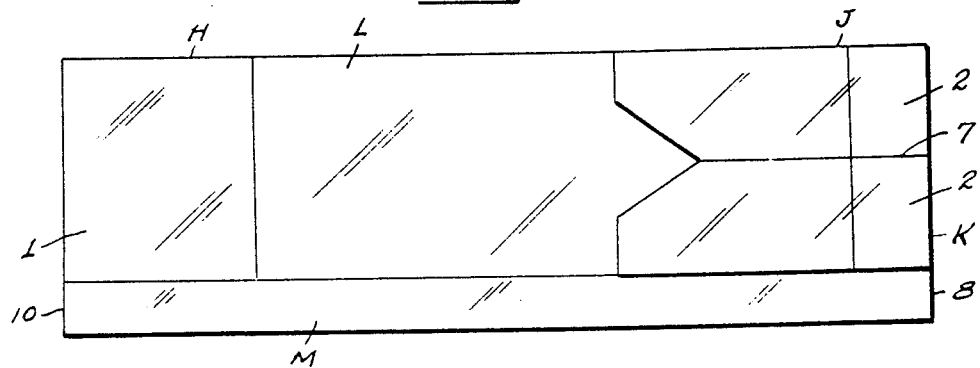
FIG. 2 is a bottom view of FIG. 1.
Figure 3:
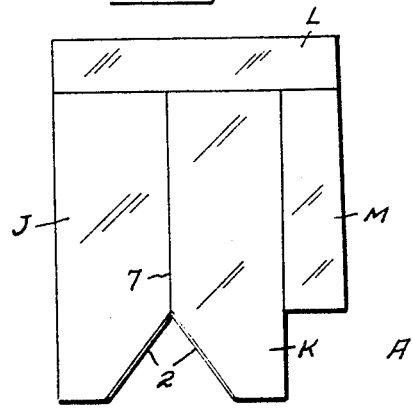
FIG. 3 is an end view of FIG. 1.

The 180° deviator, illustrated in FIGS. 1 to 3, is equivalent in optical effects to a large roofed porro prism. Any incoming light ray 6, from whatever direction, will be directed back along a path parallel to the incoming ray. See FIG. 1. Block M forms a rectangular base plate on which the optical elements are mounted. Block L, a rectangular stiffener for Block M, is cemented transversely to the edge of Block M so that both blocks form an "L" viewed from their ends 9, 10. See FIG. 3. Blocks J and K, substantially right triangular blocks having equal sides and bevelled on their hypotenuses, are optically contacted at the bevelled faces 7 so that the cuts (45° each) match, forming a 90° roof. Optical contacting (molecular adhesion) is chosen in preference to bonding by any agent because the latter may be heat sensitive. The optical contacting process entails polishing the two surfaces to be joined, and manually pressing them together at room temperature. Molecular intermingling on the joined surfaces assures bonding until separation by a high degree of thermal shock.

Blocks J and K thereby form a unit which is right triangular having equal sides and the 90° roof cut transversely into its hypotenuse. The unit is mounted by optically contacting the exposed face of Block K to base plate M, after orienting the unit so that it fits into the corner of the "L," is aligned with the ends 8, 9 of base plate M and stiffener L, and leaves its hypotenuse exposed.

Block H, a right triangular piece having equal sides, is aligned with the other ends 10, 11 of base plate M and stiffener L and optical contacted to Block M. Here too, the triangular block fits into the "L," leaving its hypotenuse exposed. All blocks in contact with Block L are cemented to it. The aluminized reflecting faces of Blocks J, K, and H comprise the optically active cube corner. Those faces are the hypotenuse 1 of triangular Block H and the 90° corner 2 in the hypotenuse of the quasi-triangular unit formed by Blocks J and K. The depth of Block H is equal to the combined depths of Blocks J and K. And the width of Block L is equal to the depth of Block H plus the depth of Block M.

"Depth" as used herein, refers to the smallest dimension of solid rectangular blocks and to the distance between the end faces of nonrectangular blocks.

The second embodiment—a 90° deviator—of the instant invention is equivalent in optical effect to a pentaprism of 90° divation angle, half of which has a roofed element 3; the other half is a plain pentaprism 4. See FIGS. 4 to 6. The reasons for this unusual design is that a normal pentaprism, though immune to rotation about one axis because of the internal reflecting surfaces of the pentagon, is not immune to rotations about the other two orthogonal axes because of the absence of reflecting surfaces in another plane. In the present invention, if an incoming ray 12 lies anywhere in a plane mutually perpendicular to both reflective surfaces 4, 5 of the pentaprism, the deviated ray will be precisely 90° from the incoming ray, regardless of the direction of the incoming ray. Constant 90° deviation is an inherent property of a pentaprism with sides 13 and 14 equal, sides 15 and 16 equal and side 18 parallel to side 17. The relevant physical law is that the angle of reflection is equal to the angle of incidence of the deviated light ray. However, should the system tilt about an axis in the aforementioned plane perpendicular to the incident ray, the existing ray will deviate substantially an equal angle in a plane perpendicular to the first plane.

The roofed half of the pentaprism 3 has precisely the opposite effect; the deviation angle for the exiting ray is in the opposite direction. Since the effects of the plain penta and of the roofed penta are exactly equal and opposite, the "centroid" or mean between the two exiting rays will always be 90° from the incoming rays. This would be true whether or not there is a tilt about the defined axis. Such a combination of a roof and a plain pentaprism is therefore truly immune to rotations. In each case, an emergent light beam, or the centroid of two emerging rays, will maintain a constant angular rotation to the incident light beam regardless of the spatial orientation of the incident beam to the prismatic assembly.

Referring now to the drawing, Block A serves as the base plate upon which all optical blocks will be mounted. It is an irregular solid pentagon. Block B is trapezoidal in nature with angles and lengths of bases and of ends corresponding to the angles and lengths of sides of Block A so that it may be mounted, as shown in FIG. 4, in alignment with three sides 13, 15 and 17 of the pentagon. Optical contact is the mode of adhesion. Next comes Block E which similarly is trapezoidal, equal in height, though only half as deep as Block B, and optical mounted, like Block B, in alignment with three sides 14, 16 and 17 of the pentagon. Block B's major base facing the center of the pentagon provides one reflective surface. The major base 5 of Block E, also facing the center of the pentagon, offers the plain half of the other reflective surface. Blocks C and D are essentially trapezoids with their major bases bevelled on opposite faces 3. Thus the two, each one-half the depth of Block E, but twice the height, may be optically contacted, bevelled face to bevelled face, to form a trapezoid of height twice those of Blocks E and B, with a 90° cut in its major base extending up one-half its height. This two-block unit is optically contacted at Block D's exposed side to Block E's exposed side so that the unit is aligned with the same three sides of the pentagon that is Block E. The two-block unit forms the roof half of the second reflective surface of the pentaprism and so is aluminized at the surface of the aforementioned 90° cut 3 running its length. The major bases of Blocks B and E (4, 5), the other critical surfaces, are also aluminized.

It should be noted at this point that dimensions provided in the drawings are for clarity and at best manifest desirable ratios and angles. They are in no way offered as absolute values. Additionally, FIGS. 1 and 4 show smaller fused quartz elements (F, G, P and Q) that indicate windows which serve to keep dirt out of the finished assemblies. These windows are supported by the mechanical housing for the deviators. Although not claimed as part of the subject invention, the windows are included to explain and to claritfy the optical principles involved: the windows show the paths of the incident light beams.

While only preferred forms of the invention are shown and described, other forms of the invention are contemplated and numerous changes and modifications may be made therein without departing from the spirit of the invention as set forth in the appended claims.

What is claimed is:

1. An optical deviator comprising a fused quartz base plate, a plurality of fused quartz blocks spatially oriented and mounted on said base plate, and aluminized reflective surfaces on said blocks, whereby a stable, rigid prismatic structure is provided presenting reflective surfaces to disperse incident light beams in a predetermined direction, said base plate being rectangular and said plurality of blocks consisting of a rectangular stiffener cement transversely on the edge of said base plate to form an "L;" a two-prism unit consisting of two right triangular blocks having equal sides and beveled on their hypotenuses and optically contacted at the beveled faces so that the bevels form a 90° corner, said unit being optically contacted to said base plate whereby said unit is aligned with the ends of said base plate and said stiffener and fits into the corner of the "L" formed by the two last named units and exposes its hypotenuse; an isosceles right triangular block equal in depth to said two-prism unit and optically contacted to said base plate whereby the last named right triangular block aligns with the free ends of said base plate and said stiffener, fits into the L formed by the base plate and the stiffener, and leaves its hypotenuse exposed.

2. The optical deviator set forth in claim 1, wherein said aluminized reflective surfaces consist of the hypotenusal face of said isosceles triangular block and said 90° corner.

3. An optical deviator comprising a fused quartz base plate, a plurality of fused quartz blocks spatially oriented and mounted on said base plate, and aluminized reflective surface on said blocks, whereby a stable, rigid prismatic structure is provided presenting reflective surfaces to disperse incident light beams in a predetermined direction, wherein said base plate is pentagonal and said plurality of blocks consists of two trapezoidal blocks, each equal in height to the depth of said base plate and one being twice the depth of the other, said trapezoidal blocks having lengths of minor bases and legs and the angles therebetween equal to two opposed sets of sides and the included angles of said pentagonal base plate, whereby said trapezoidal blocks may be aligned with said sides and optically contacted to the face of said base plate with the major bases of said trapezoidal blocks facing one another; and two quasi-trapezoidal blocks each twice the height of said first named trapezoidal blocks but one-half the depth of the shallower of said first named trapezoidal blocks, said quasi-trapezoidal blocks having major bases beveled on opposite sides and optically contacted to each other on their respective beveled faces to form a trapezoidal unit with a 90° cut in its major base, said unit being optically contacted to the exposed face of said first named trapezoid at the exposed face of one of said quasi-trapezoids, whereby the minor bases and legs of said first named trapezoid and said unit are in alignment.

4. The optical deviator set forth in claim 3, wherein said aluminized reflective surfaces consist of said 90° cut, and the major bases of said two first named trapezoidal blocks.

References Cited

UNITED STATES PATENTS 2,400,111  5/1946  Gardner _____ 350—301

DAVID SCHONBERG, *Primary Examiner.*

MICHAEL J. TOKAR, *Assistant Examiner.*